July 24, 1956     R. H. BAILES ET AL     2,756,123
URANIUM-VANADIUM RECOVERY AND PURIFICATION PROCESS
Filed May 3, 1950     4 Sheets-Sheet 1

EFFECT OF HCl CONCENTRATION ON THE ELUTION OF U
FROM ANIONIC EXCHANGE RESIN AFTER V REMOVAL

AMINE ELUTION OF U FROM ANIONIC EXCHANGE RESIN AFTER V REMOVAL

INVENTORS.
RAY S. LONG
BY    RICHARD H. BAILES

ATTORNEY.

INVENTORS.
RAY S. LONG
RICHARD H. BAILES

ELUTION OF U FROM ANIONIC EXCHANGE RESIN WITH 5M NaCl AND H₂O (V retained on resin)

INVENTORS.
RAY S. LONG
RICHARD H. BAILES
BY
ATTORNEY.

United States Patent Office 2,756,123
Patented July 24, 1956

2,756,123

URANIUM-VANADIUM RECOVERY AND PURIFICATION PROCESS

Richard H. Bailes, Walnut Creek, and Ray S. Long, Vallejo, Calif., assignors, by mesne assignments, to the United States of America as represented by the United States Atomic Energy Commission Application May 3, 1950, Serial No. 159,744

15 Claims. (Cl. 23—14.5)

This invention relates to a process for separating substances by adsorption upon and elution from an ionic exchange resin. More particularly the invention relates to processes wherein uranium and vanadium are recovered in a purified form from solutions containing the same and impurities by means of an anionic exchange process.

Certain aspects of the present case are also disclosed in the related and copending case of Ray S. Long and Richard H. Bailes, Serial No. 165,532, filed June 1, 1950.

It has been known for some time that small amounts of uranium and vanadium are present in phosphoric acid or other acidic phosphatic solutions such as are obtained during the manufacture of triple-superphosphate fertilizer by the leaching of crude phosphate rock with sulfuric acid. Heretofore, the recovery of these valuable components was infeasible because of the prohibitive cost of applying known recovery methods to such low grade sources.

In spite of the low concentration of vanadium and uranium values in such phosphatic materials, it will be appreciated that if recovery of these materials could be made economically practicable, a major source of uranium, and an increased supply of vanadium would thereby be made available since exceedingly large amounts of phosphate materials are mined and processed annually in the production of phosphoric acid and phosphate fertilizers. Moreover, other similar low-grade sources of uranium and vanadium are known which are not amenable to present recovery methods.

Now it has been discovered that ion exchange resins may be employed under certain conditions to render feasible the recovery of vanadium and uranium values from acidic solutions and, especially, from acidic phosphatic solutions.

It is, therefore, a principal object of the invention to provide an efficient and practical process for the separation of uranium and vanadium from each other and from acidic solutions.

Another object of the invention is to provide a process for the recovery of uranium and vanadium from acidic phosphatic solutions without impairment of the solutions for further use in industrial processes.

Another object of the invention is to provide a process for the separation of uranium and vanadium from each other and from impurities in acidic phosphatic solutions wherein the uranium and vanadium are adsorbed on an anionic exchange resin.

A further object of the invention is to provide an anionic exchange process wherein materials are eluted separately from each other following selective oxidation or reduction of the materials while adsorbed on an anionic exchange resin.

A still further object of the invention is to provide an anionic exchange process for economically recovering and purifying small amounts of uranium and vanadium contained together with impurities in relatively concentrated acidic phosphatic solutions.

Other objects and advantages will become apparent from a consideration of the following description taken in conjunction with the accompanying drawings of which:

Figure 1:
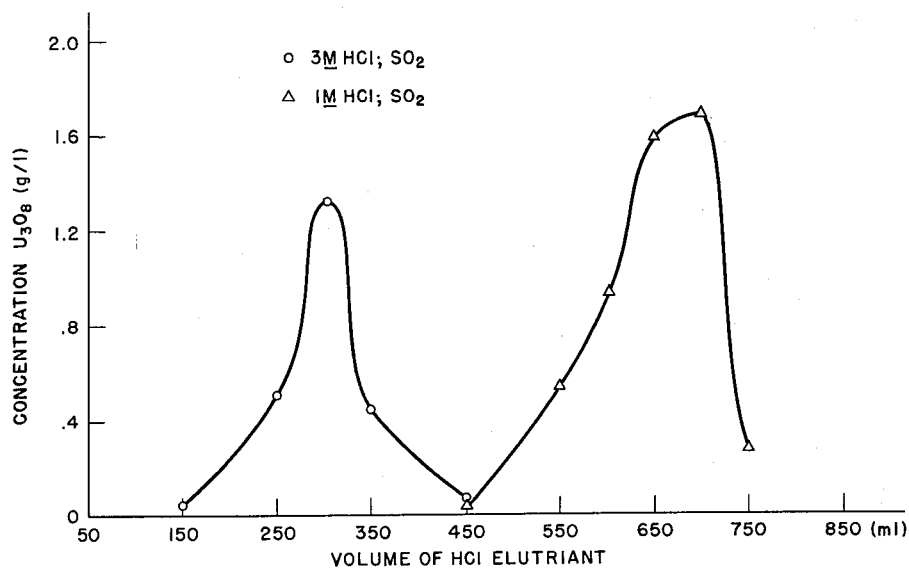
Figure 1 is a graphical representation of the relative effectiveness of different hydrochloric acid concentrations for the elution of uranium from an anionic exchange resin following removal of vanadium.

Uranium and vanadium may be recovered from solutions of widely varying compositions by the processes of the invention. Moreover, the processes of the invention are well suited to the recovery of these materials from phosphoric acid or other acidic phosphatic solutions such as those which are obtained in the various stages of phosphate fertilizer production. An analysis of a typical solution of this type is indicated in the following table:

TABLE I

| | | |
|---|---|---|
| $H_3PO_4$ | g./l | 330 |
| Fe | g./l | 3.02 |
| V | g./l | 1.48 |
| $U_3O_8$ | mg./l | 95 |
| Ca | percent | 0.155 |
| Mg | do | 0.2 |
| Al | do | 0.34 |
| F | do | 1.13 |
| Sulfate | do | 1.22 |
| Sp. gr | | 1.207 |

Solutions which vary widely in the relative concentration of the various materials indicated and in the presence or absence of particular components or the presence of other similar materials are also suitable for treatment with appropriate modification of the process. Also, uranium and vanadium may be recovered from solid substances or other solutions by preparing acidic solutions therefrom and applying the methods of the invention to the treatment of the solution. In the event that the solution does not contain sufficient complexing agent to assure the adsorption of the uranium as an anionic species sufficient complexing material such as phosphate may be added to the solution and the solution may then be treated as described below.

Considering now, particular details of the processes of the invention as applied to the concentration and purification of vanadium and uranium contained in phosphatic solutions of the type described. In accordance with the invention the phosphoric acid solution is subjected to an oxidizing treatment as may conveniently be done by contacting the crude acid with an oxidizing agent such as manganese dioxide, whereby the vanadium is oxidized to the pentavalent oxidation state, in which state it exists as an anion (e. g., $VO_3^-$ or a phosphate complex of this anion) and may be adsorbed upon an anionic exchange resin. The agent used to oxidize the vanadium to the pentavalent state must be vigorous since vanadium in this state is itself a strong oxidizing agent. Other oxidizing agents which have been found to be satisfactory include electrolytic oxidation, permanganate, chlorate, and hydrogen peroxide. The oxidation state of vanadium is easily determined from the color of the solution since pentavalent vanadium solution is yellow, while tetravalent vanadium solution is blue, and a solution mixture of the two states is green. Complete oxidation of the vanaduim is indicated when the yellow color of the solution does not increase in intensity with the addition of more oxidizing agent.

For proper operation of the process it is required that the uranium be present in the uranyl state. However, since uranium is more easily oxidized than vanadium, the oxidation of the vanadium to the pentavalent state assures the oxidation of the uranium to the hexavalent state. Hexavalent uranium, in such a solution, exists as an anionic phosphate complex (uranyl phosphate complex) and, as such, may be adsorbed by an anionic exchange resin.

Then the oxidized crude phosphoric acid is passed through a bed, usually columnar in form, of an anionic exchange resin, preferably of the strong base type, whereupon the uranium and vanadium are adsorbed thereon together with other anionic materials such as iron, fluorides, fluosilicate and phosphate by ion exchange therewith. Cationic materials remain in the solution and, accordingly, are separated from the adsorbed materials.

The resin bed may be contained in apparatus which provides a suitable support for the resin and has influent and effluent stream openings or connections. Since the progress of the operation of the process is easily checked by observation of the color of the solution provision for visual observation of the solution is desirable. The resin is ground to sizes which allow adequate flow rates and maximum adsorption of ions, which sizes are of the order of 10 to 100 standard mesh. Preferably, the resin is in the chloride, phosphate, or sulfate form.

While the strong base type of anionic exchange resin such as those in which quaternary ammonium groups provide the ionizable components work most satisfactorily and are preferred, other anionic exchange resins are also operable and may likewise be employed. Dowex 1 and Dowex 2, strongly basic anionic exchange resins, employed in the various operations of the following descriptions and illustrative examples, are stated by the manufacturer to be equivalent in function and substantially the same. These materials are manufactured by procedures which are substantially the same as described in Examples 2 and 4 of U. S. Patent No. 2,614,099, filed December 29, 1948, and issued October 14, 1952.

The uranium and vanadium adsorbed upon the anionic exchange resin are separated from each other and are obtained in concentrated and purified forms by a selective reduction of the vanadium to an oxidation state in which it is capable of forming a cation in the elutriant, eluting the vanadium as a cation and thereafter eluting the uranium, or, alternatively, by an elution of the uranium as the initial step employing a specific eluting agent followed by elution of the vanadium as a cation following reduction to the lower oxidation state.

In the first method it is necessary that the reducing agent selectively reduces the adsorbed vanaduim to the lower oxidation state, preferably the tetravalent oxidation state, without eluting or reducing the adsorbed uranium. In the second method, this consideration is of no importance since the uranium is not present. Various reducing agents including sulfur dioxide gas or ferrous sulfate solutions have been found satisfactory for performing either the selective reduction or the reduction following elution of the uranium. The reduction and elution may be performed simultaneously if an appropriate combination reducing and eluting solution is employed. For example, an aqueous solution of sulfur dioxide or of ferrous sulfate may be so employed.

Selection of the appropriate method of concentrating and purifying the uranium and vanadium by selective elution is determined by the reduction method previously employed or upon which of the alternative modes of procedure indicated above is being employed. In the event that sulfur dioxide gas is employed, to selectively reduce the adsorbed vanadium, water or an aqueous solution of sulfur dioxide may be used to elute the tetravalent vanadium as a cation. The amount of sulfur dioxide solution should be limited to the range which is sufficient to assure efficient elution of the vanadium and which is insufficient to adsorb upon the resin in quantities which will interfere with reuse of the resin for subsequent adsorptions. Phosphate, which also is adsorbed by the resin, is removed by the sulfur dioxide elutriant and appropriate adjustment of the amount of elutriant is desirable to assure elution of phosphate from the resin otherwise the phosphate will appear during the subsequent elution of uranium.

For example, a column 34" long and 1" diameter of 100-mesh quaternary-ammonium type anionic exchange resin was saturated with respect to uranium by contact with about three liters of oxidized phosphoric acid solution of the type described above. Elution of the vanadium and phosphate with 300 ml. of saturated sulfur dioxide solution resulted in the subsequent elution band of uranium being sharply defined and free of phosphate while the use of only 100 ml. of the sulfur dioxide solution under the same conditions caused the elution band of the uranium to be poorly defined and the product was badly contaminated with phosphate. For the amount of phosphoric acid of the composition as indicated above, about 200 to 300 ml. of aqueous sulfur dioxide solution appears to yield optimum results; however, modification of this value is required for an acid having a different composition.

In processing commercial phosphoric solutions of a composition similar to that indicated above it has been found that the column becomes saturated with respect to uranium long before the vanadium saturation is approached. Advantageously, in such a case, the uranium may be selectively eluted from the resin and the resin again contacted with fresh portions of oxidized acid, in a partial cyclic manner, whereupon uranium and more vanadium is adsorbed by the resin and the uranium-elution, fresh acid-adsorption partial cycle repeated until the resin is also saturated with respect to vanadium before the vanadium is reduced and eluted from the resin thereby terminating a complete cycle. A dilute hydrochloric acid or chloride salt solution appears to be quite specific for eluting the uranium alone if a concentration below a critical value of about 3 N is employed. Chloride concentrations above this value in the elutriant do not remove the adsorbed uranium. However, a water elution following treatment of the adsorbed materials with chloride solutions more concentrated than about 3 N, will remove the uranium and leave the vanadium adsorbed on the resin.

The uranium remaining adsorbed on the anionic exchange column following reduction and elution of the vanadium is eluted by a variety of agents including acid solutions, dilute chloride solutions, solutions of the hydrochloride salts of methylamine, hydroxylamine, ethylenediamine, triethanolamine, tetraethylene-pentamine and by treatment with concentrated chloride solutions followed by elution with water.

Phosphate adsorbed on the resin may also be removed before elution of the vanadium and uranium by treatment with sulfate solutions. A sulfate solution is passed through the column until it is noted that the solution is becoming yellow in color due to elution of vanadium in the pentavalent oxidation state. Uranium and vanadium subsequently eluted with other agents is substantially free of phosphate contamination.

It has been noted that, in general, increasing the temperature of the eluting solution above room temperature and to about 60° C. markedly improves the efficiency of the elution.

Particular details of the processes of the invention will become more apparent from a consideration of the following illustrative examples of the operation of the processes for the recovery of uranium and vanadium from phosphoric acid solutions:

EXAMPLE I

This example is illustrative of a process wherein uranium and vanadium were adsorbed by an anionic exchange resin from an oxidized phosphoric acid solution and then the vanadium was selectively reduced and eluted from the resin with a sulfur dioxide solution while the uranium was subsequently eluted with a hydrochloric acid solution.

Sufficient oxidized phosphoric acid having a composition similar to that described above was passed through a column 34" long and 1" diameter of Dowex 1 resin (quaternary ammonium type) in the chloride form to saturate the resin with respect to uranium. Adsorbed vanadium and phosphate were eluted from the resin with a partially saturated sulfur dioxide solution. Then the uranium was eluted from the resin using hydrochloric acid solutions at a flow rate of 13 ml./min./sq. in. In identical experiments using 1 and 3 M hydrochloric acid solution, respectively, the results indicated in Fig. 1 were obtained. It is to be noted that the quantity of uranium eluted rises sharply between 3 M and 1 M concentration of the acid and, therefore, the efficiency of the elution is somewhat critically dependent thereon.

EXAMPLE II

This example is illustrative of processes wherein amine salts are employed to elute uranium following elution of vanadium.

Figure 2:
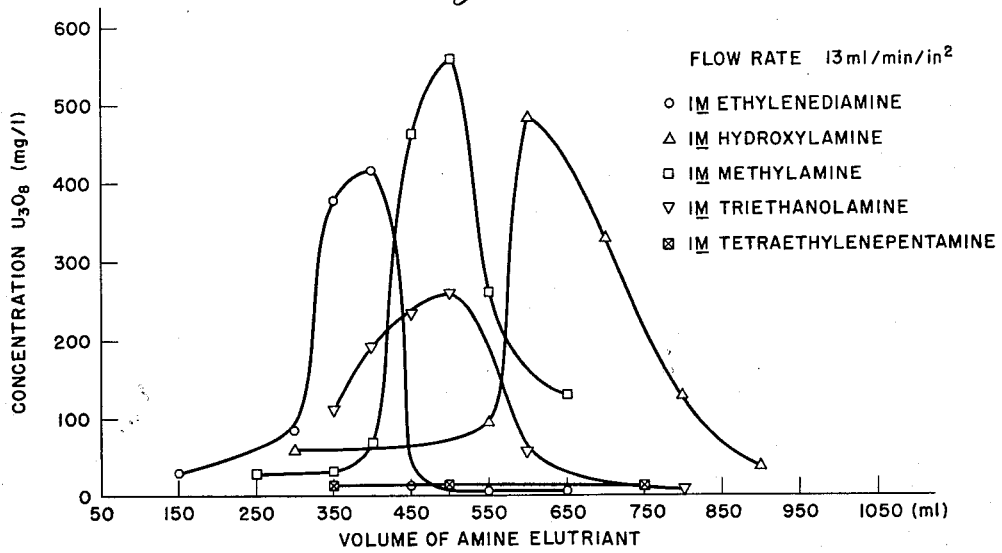
Fig. 2 is a graphical representation of the characteristics of the elution of uranium by certain amine reagents from an anionic exchange resin following removal of vanadium.

Columns 1" diameter and packed to a height of 34" with 10 to 20 mesh Dowex 2 (a quaternary ammonium type resin) were saturated with respect to uranium by passing oxidized phosphoric acid similar to that described above through the columns. Vanadium and phosphate were eluted from the columns with an aqueous sulfur dioxide solution and the adsorbed uranium was then eluted, in identical experiments, with 1 molar solutions of the monohydrogen chloride salts of the following amines: methylamine, hydroxylamine, ethylenediamine, triethanolamine, and tetraethylene-pentamine with a flow rate of 13 ml./min./in.$^2$. The results of these experiments are graphically illustrated in Fig. 2 of the drawing.

Other experiments indicate that both the amine and chloride are essential if high concentrations of uranium in the elutriant are to be obtained. Furthermore, it has been determined that the presence of sulfate is detrimental and that increasing the temperature of the eluting solution to about 60° C. greatly increases the efficiency of the elution.

EXAMPLE III

This example is illustrative of the selective elution of vanadium and phosphate from the resin and subsequent elution of the uranium with dilute chloride solution.

A column 1" diameter and 34" in length of 100 mesh Dowex 1 (a quaternary ammonium type resin) was saturated with respect to uranium with 3 liters of oxidized phosphoric acid similar to that described above. The vanadium was "upflow" eluted from the column with 200 ml. of aqueous $SO_2$ and then the uranium was eluted with 700 ml. of 1 M sodium chloride solution.

"Upflow" elution as employed in this process comprises passing the elutriant in the reverse direction to that in which the oxidized acid was passed. Since the vanadium is adsorbed in a narrow band at the entering end of the column while the uranium is distributed more or less uniformly throughout the column due to the lack of sufficient vanadium in the fed acid to saturate the resin with respect to vanadium, this manner of operation greatly improves and facilitates the elution of the vanadium from the column. The vanadium is required to traverse only a relatively short portion of the column.

Figure 3:
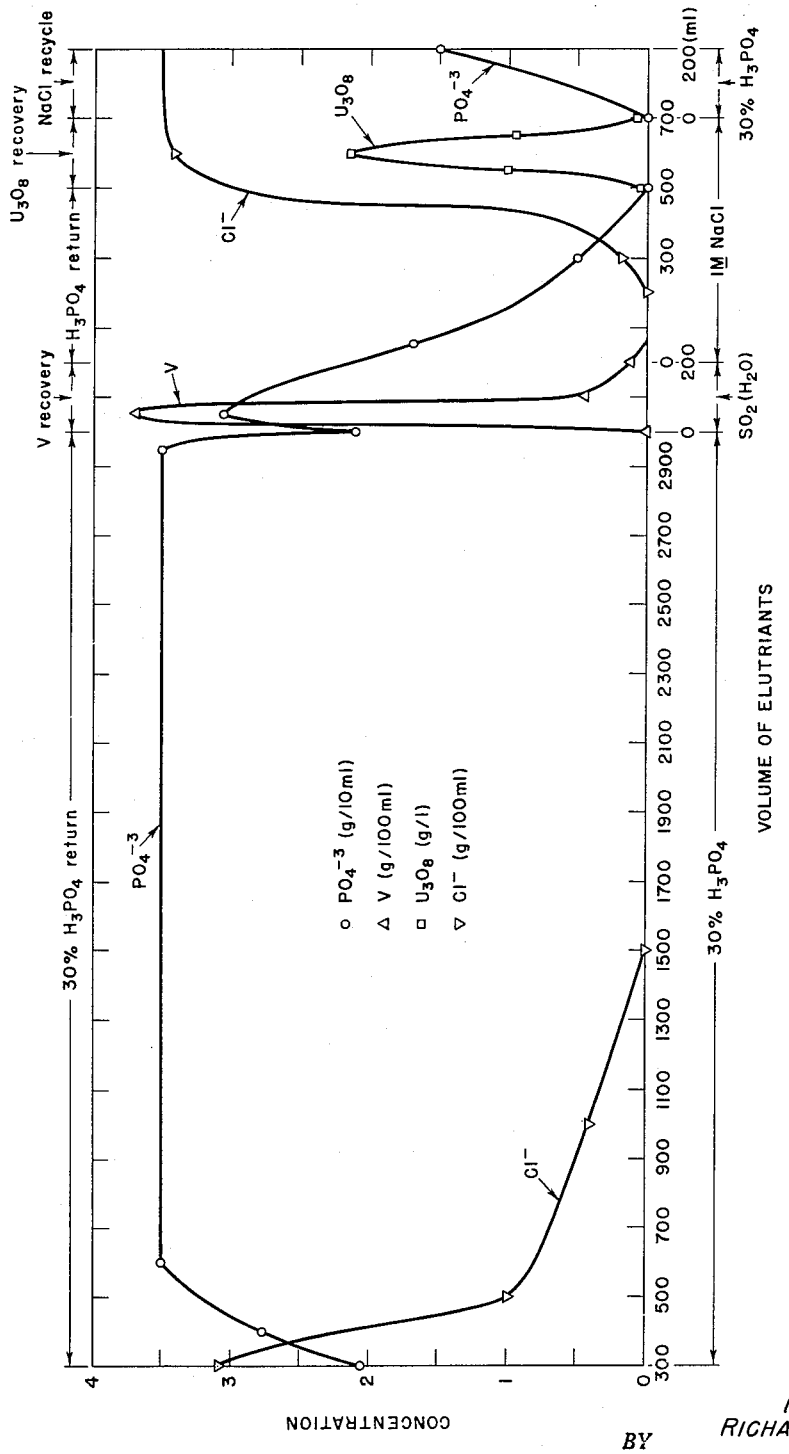
Fig. 3 is a graphical representation of one complete cycle of a process for recovering uranium and vanadium separately from each other and from phosphoric acid solution.

The complete data for this one cycle are plotted in Fig. 3, to which attention is now invited. During adsorption at the beginning of the cycle, the phosphate concentration rises gradually and the chloride concentration decreases correspondingly in the effluent as the phosphate replaces the adsorbed chloride of the resin (the resin was originally in the chloride form). The results of the upflow elution of the vanadium with aqueous sulfur dioxide solution is indicated beginning at 3000 ml. on the abscissae scale. The phosphate, which was adsorbed from the acid at the beginning of the adsorption, was partially eluted along with the reduced vanadium by the 200 ml. of aqueous sulfur dioxide with the phosphate elution being completed and the sodium chloride concentration in the effluent reaching the original value of 1 M after 500 ml. of the sodium chloride elutriant had left the column. Since at this point no phosphate was left to complex the uranium, the uranium elution peak was now obtained in the chloride elutriant. When the uranium elution has been completed (after passage of about 700 ml. of sodium chloride solution in this example) the resin is in a regenerated state corresponding to the original state and prepared for the treatment of fresh portions of oxidized phosphoric acid solution.

At the beginning of the vanadium-uranium adsorption step, the effluent from the column contains substantially only sodium chloride and this fraction of the effluent is stored and used in a subsequent elution. Phosphate contained in the first portion of effluent obtained during aqueous sulfur dioxide elution is recovered and returned to the treated acid and the portion of effluent following uranium elution, which contains mainly sodium chloride, is stored for recycling as an elutriant all as indicated along the upper edge of the graph of Fig. 3.

EXAMPLE IV

This example illustrates the elution of adsorbed vanadium from the resin by ferrous sulfate solution and a subsequent elution of the uranium with sodium chloride solution.

Figure 4:
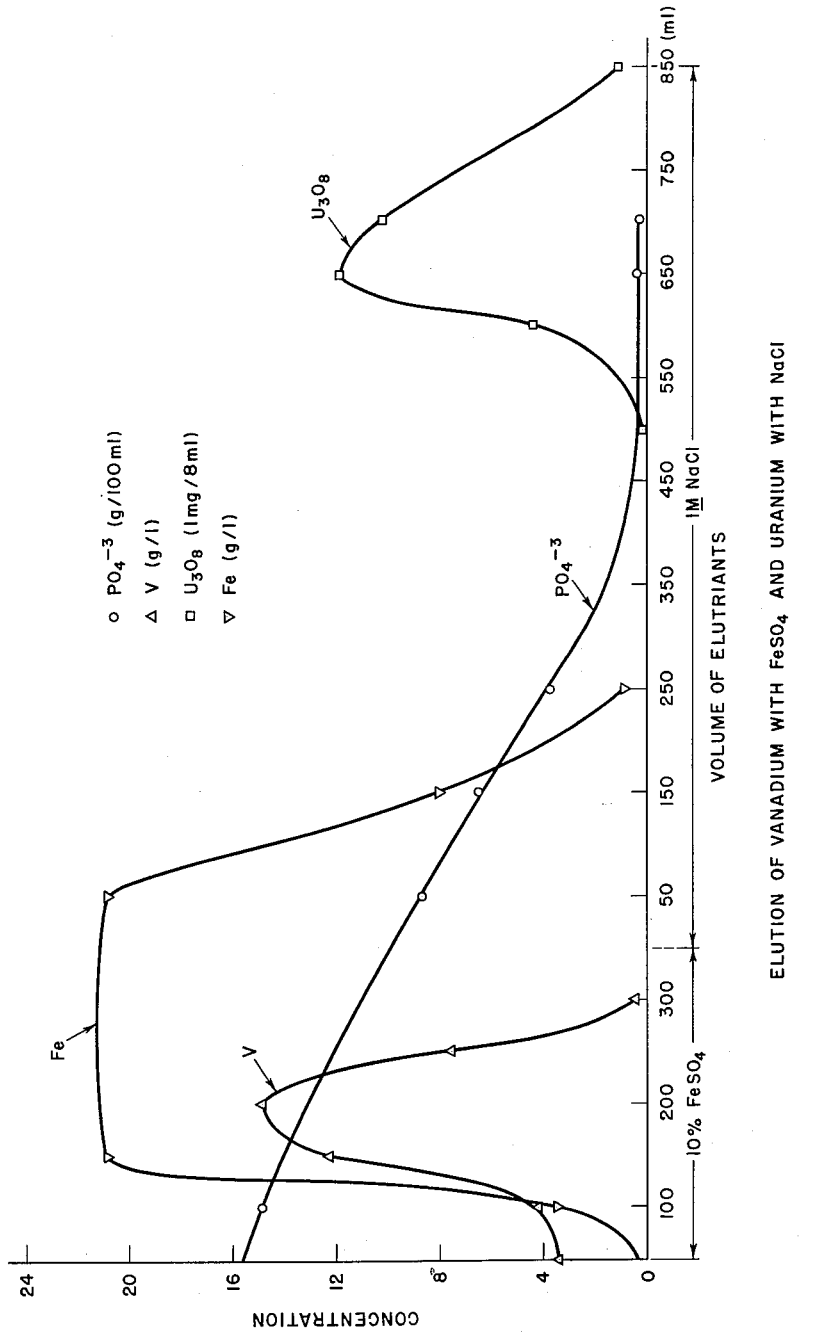
Fig. 4 is a graphical representation of the characteristics of an elution process wherein vanadium is eluted with ferrous sulfate solution and uranium is eluted with sodium chloride solution.

A column 34" long and 1" diameter of Dowex 2 (a quaternary ammonium type resin) was saturated with respect to uranium by passing oxidized phosphoric acid similar to that described above through the column. The vanadium was then upflow eluted at 60° C. with a 10% ferrous sulfate solution. Thereafter the adsorbed uranium was downflow eluted with a 1 M sodium chloride solution. Fig. 4 illustrates the results obtained by this procedure and as may be seen from Fig. 4, the vanadium is obtained together with some phosphate in the ferrous sulfate elutriant while the uranium is obtained substantially pure in a chloride solution.

Table II below demonstrates the effect of changing the ferrous ion concentration with respect to vanadium recovery and also illustrates the effectiveness of upflow vanadium elution. The elutions were performed on 34" long and 1" diameter resin columns at 60° C. All vanadium elutions were upflow except where noted.

TABLE II

*Vanadium elution with ferrous ion*

| Effluent Volume, ml. | 5% FeSO₄.7H₂O | 10% FeSO₄ | 20% FeSO₄ | 5% FeCl₃ | 20% FeSO₄* |
|---|---|---|---|---|---|
| | (Concentration of V (g/l.)) | | | | |
| 50 | | | 3.55 | 7.0 | | 2.5 |
| 100 | | 4.2 | 4.03 | | 1.3 | |
| 150 | | | 12.0 | 29.9 | 10.6 | |
| 200 | | 8.95 | 14.3 | 29.3 | 14.0 | 9.3 |
| 250 | | 8.75 | 7.7 | | 13.0 | |
| 300 | | 8.06 | | 11.5 | 12.2 | 6.1 |

*Regular elution.

EXAMPLE V

A sulfate solution was used to remove phosphate present on the resin, prior to the elution of the adsorbed vanadium and uranium. The following example is illustrative of this modification of the invention.

Figure 5:
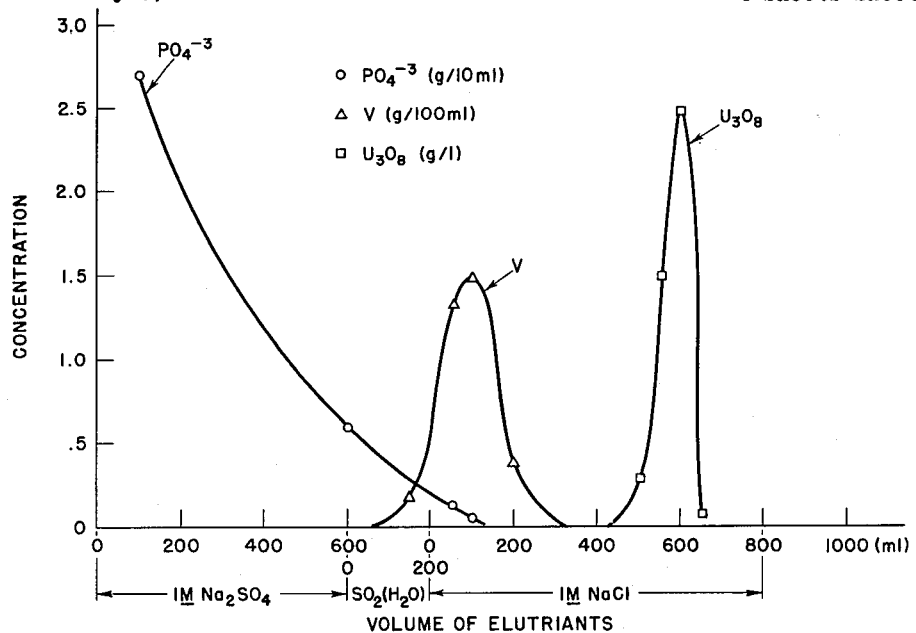
Fig. 5 is a graphical representation of a process wherein vanadium and uranium are selectively eluted from an anionic exchange resin with a sodium chloride solution following removal of phosphate ions from the resin by elution with sodium sulfate solution and reduction of the vanadium with aqueous sulfur dioxide.

A column 34″ long and 1″ diameter of 100 mesh Dowex 1 resin (a quaternary ammonium type) in the chloride form was treated with 3 liters of oxidized phosphoric acid, having a composition similar to that described above, to saturate the resin with uranium which resulted in the resin also becoming one-fourth saturated with vanadium. The column was then treated with 600 ml. of 1 M sodium sulfate solution to remove most of the phosphate without removing the adsorbed vanadium and uranium. Two-hundred ml. of aqueous sulfur dioxide was then used to elute the vanadium and the uranium was subsequently eluted with 1 M sodium chloride solution. The results of the elution are plotted in Fig. 5. As may be seen from said Fig. 5, the uranium and vanadium are obtained in solutions in forms substantially completely separated from each other and from the phosphate. Accordingly, highly purified uranium or vanadium compounds may be prepared from these solutions by appropriate treatment. When this method of uranium elution is employed and sufficient chloride solution has passed through the column (at about 700 ml. of salt solution in this example), the resin is in a regenerated state and fresh oxidized phosphoric acid solution is admitted and the above cycle repeated.

EXAMPLE VI

Figure 6:
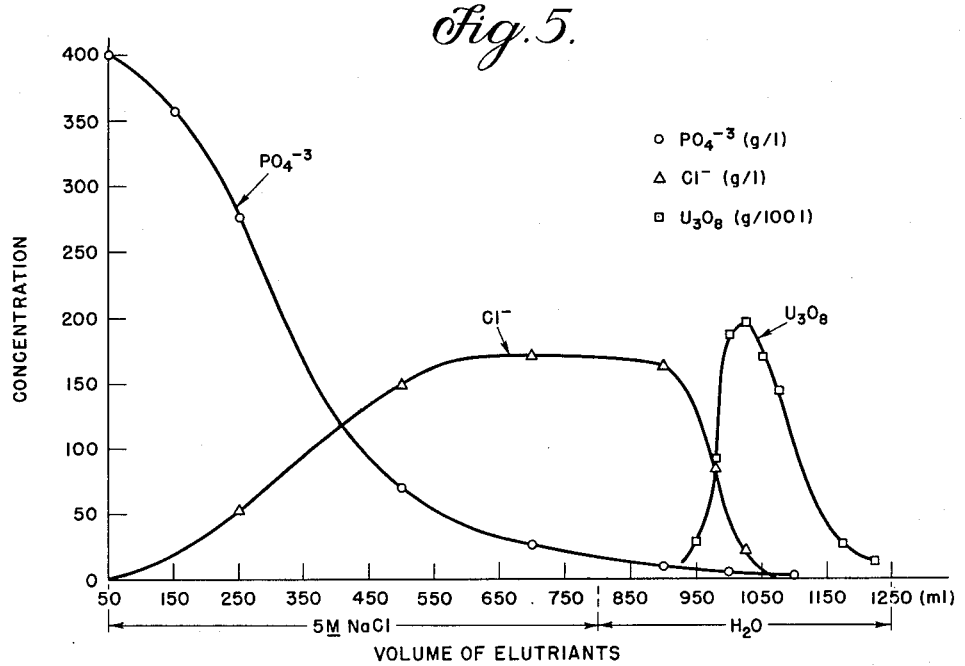
Fig. 6 is a graphical representation of the selective elution of uranium from an anionic exchange resin with water following removal of the phosphate by selective elution with concentrations of about 5M sodium chloride in the elutriant.

Uranium adsorbed as the uranyl phosphate complex when treated with 5 M sodium chloride solution is converted to a chloride complex on the resin. This latter complex may be eluted from the resin with water. The results obtained by treating a column 34″ long and 1″ diameter of Dowex 1 resin (a quaternary ammonium type) previously saturated with uranium, from 3 liters of oxidized phosphoric acid similar to that described above, with 800 ml. of 5 M sodium chloride solution followed by elution with water are indicated in Fig. 6. The uranium peak appears in the water with a height of 2 g. U₃O₈/l. It will be noted that both the chloride and the phosphate have reached a low value before the uranium is eluted. The uranium, therefore, is obtained in a water solution in a highly purified form.

The purity of the water solution of uranium can be controlled by varying the amount of chloride in the treating solution above the critical value, supra. For example, under conditions similar to those employed above, when 500 ml. of 5 M sodium chloride solution were used, the phosphate was still coming off at a rate of about 50 g./l. when the water was applied. The presence of phosphate lowered the uranium peak to about 1.2 g./l. When only 300 ml. of the sodium chloride solution was used, an amount which was insufficient to exhaust the resin column of the phosphate, the uranium peak was lowered to 0.3 g./l. and the phosphate level was quite high. If the concentration of salt in the solution is decreased from 5 M to 3 M, the latter being a partial uranium elutriant, two uranium peaks occur, one in the 3 M sodium chloride and one in the water elution which follows. In processes using 5 M sodium chloride treatment and water elution, the vanadium remains on the resin but changes to a dark red color, possibly due to replacement of the phosphate in the anionic species by chloride.

With the uranium and phosphate removed by chloride, but with the vanadium remaining on the top quarter of the column, the column was again saturated with another 3 liters of oxidized phosphoric acid. The same uranium adsorption resulted as for fresh resin and the vanadium band was broadened to encompass almost half of the resin column. The uranium was again eluted as above and the cycle repeated to a total of four cycles and the vanadium was then eluted with aqueous sulfur dioxide solution. With the particular resin and under the conditions employed the resin is only one-fourth saturated with vanadium when saturated with respect to uranium; advantageously, such a column may be eluted of vanadium with aqueous sulfur dioxide solution only once every four cycles at which time the column is completely saturated with vanadium, consequently producing a very much higher vanadium to phosphate ratio in the elutriant than that obtained in the elution of one-fourth saturated columns.

While there has been described what are at present considered to be preferred embodiments of the invention, it will be understood that various modifications may be made therein and it is intended to cover all such modifications as fall within the scope of the appended claims.

We claim:

1. The process of recovering uranium and vanadium values from a crude phosphoric acid solution comprising treating said solution with a strong oxidizing agent to convert said values into uranyl phosphate complex anions and pentavalent vanadium anions in the solution, contacting the oxidized acid solution with an anionic exchange resin to adsorb said anions thereon and cations and at least a portion of the phosphate ions remain in the solution, selectively reducing the pentavalent vanadium anions adsorbed on the resin by means of a reducing agent to yield tetravalent vanadium thereon, then contacting the reduced adsorbate with an aqueous elutriant solvent for the tetravalent vanadium to elute the tetravalent vanadium as a cation from the resin yielding a solution of separated vanadium values, and finally contacting the adsorbate with an aqueous elutriant solvent for the uranium to elute the uranium from the resin yielding a solution of separated uranium values.

2. The process for recovering uranium and vanadium values from an acidic phosphatic solution comprising treating said solution with a strong oxidizing agent to convert said values into uranyl phosphate complex and pentavalent vanadium anions therein, adsorbing said anions on a strongly basic anionic exchange resin, whereby some phosphate is also adsorbed, treating the adsorbed materials with a sodium chloride solution of about 5 M concentration to elute phosphate from the resin and convert the adsorbed uranyl phosphate complex to a chloride complex, eluting the adsorbed uranium with water from the resin yielding a solution of the separated uranium values, then treating the adsorbate with a reducing agent to convert the vanadium to the tetravalent oxidation state on the resin, and then eluting the vanadium with an aqueous solvent to produce a solution of separated tetravalent vanadium values.

3. The process for recovering uranium and vanadium values from an acidic phosphatic solution comprising treating said solution with a strong oxidizing agent to convert said values into uranyl phosphate complex and pentavalent vanadium anions therein, adsorbing said anions on a strongly basic anionic exchange resin from a first portion of the oxidized solution, whereby some phosphate is adsorbed and the resin is only partially saturated with respect to vanadium and is saturated with respect to uranium, treating the adsorbed materials with a sodium chloride solution of about 5 M concentration, to elute the phosphate from the resin and convert the adsorbed uranyl phosphate complex to a chloride complex, eluting the adsorbed uranyl chloride complex with water from the resin yielding the separated uranium values as an aqueous uranyl chloride solution, repeating the steps of adsorbing the anions from successive portions of said oxidized solution, successively treating with chloride and successively eluting the portions of uranium which are adsorbed until the resin is also saturated with respect to vanadium and then eluting the vanadium after the last portion of uranium has been eluted by means of treatment with a reducing agent and contact with an aqueous solvent for tetravalent vanadium thereby yielding an aqueous solution of tetravalent vanadium values.

4. In a process for separating vanadium values from solutions containing the same, a complexing agent and impurities, the steps comprising oxidizing the vanadium values to the pentavalent state with an agent selected from the group consisting of potassium permanganate, manganese dioxide, hydrogen peroxide and sodium chlorate, thereby producing vanadium anions in the solution, contacting said oxidized solution with an anionic exchange resin of the quaternary ammonium type to adsorb anionic vanadium values thereon, reducing said adsorbed vanadium values to the tetravalent oxidation state by contacting gaseous sulfur dioxide therewith, and eluting said reduced vanadium values as a cation with an aqueous solution of sulfur dioxide.

5. The process as set forth in claim 4, wherein ferrous sulfate solution is employed to reduce said vanadium to the tetravalent oxidation state and to elute the tetravalent vanadium.

6. In a process for separating vanadium values from a phosphatic solution, the steps comprising treating said solution with an oxidizing agent to place the vanadium values in an anionic pentavalent oxidation state, contacting said oxidized vanadium solution with a plurality of anionic exchange resin columns to adsorb vanadium anions thereon, reducing the adsorbed vanadium anions to the tetravalent state by contact with gaseous sulfur dioxide, eluting the reduced vanadium as a cationic value from one of said resin columns by means of an aqueous solution of sulfur dioxide, then eluting the reduced vanadium from a second resin column with the effluent elutriant from said resin column after resaturating said elutriant with sulfur dioxide gas, and repeating the foregoing elution step with others of said plurality of columns finally obtaining a solution with an enhanced concentration of vanadium values.

7. In a process for recovering and purifying vanadium values contained in acidic phosphatic solutions the steps comprising oxidizing the vanadium values to an anionic pentavalent state, contacting the oxidized acidic phosphatic solution with an anionic sxchange resin whereby said anionic vanadium values are adsorbed thereon together with some phosphate, reducing said adsorbed vanadium to the tetravalent oxidation state, eluting the adsorbed phosphate by means of a sodium sulfate solution, and then eluting the tetravalent vanadium values as cations from said resin by means of a sulfurous acid elutriant and obtaining thereby a solution of purified vanadium values.

8. In a process for separating and recovering uranium and vanadium values from a substance, the steps comprising treating said substance to produce therefrom an acidic aqueous solution of said values, treating said solution with oxidizing and complexing agents to produce uranyl and pentavalent vanadium anions therein, adsorbing said uranium and vanadium anions by contact with an anionic exchange resin, whereby cationic materials remain in the effluent, treating the adsorbate obtained in the preceding step with a selective reducing agent to reduce the adsorbed pentavalent anions to a tetravalent vanadium state on the resin, treating the adsorbate with a selective aqueous elutriant to elute the reduced vanadium as a cation away from the uranium values on the resin yielding a purified aqueous solution of the vanadium values, and then treating the adsorbate with an elutriant to elute the uranium therefrom yielding a purified aqueous solution of the uranium values.

9. In a process for separating and recovering uranium and vanadium values from a substance, the steps comprising treating said substance to produce therefrom an acidic aqueous solution of said values, treating said solution with oxidizing and complexing agents to produce uranyl and pentavalent vanadium anions of said values, adsorbing the said uranyl and vanadium anionic values on an anionic exchange resin while at least cationic materials remain in the effluent, treating the adsorbate obtained in the preceding step with a selective aqueous elutriant agent to elute the uranium values away from the vanadium which remains on the resin yielding an aqueous solution of the separated uranium values, and then treating the residual adsorbate with reducing and aqueous solvent agents to elute the reduced vanadium in a cationic state yielding an aqueous solution of separated vanadium values.

10. In a process for separating and recovering uranium and vanadium values from a crude phosphoric acid solution, the steps comprising treating said acid with a strong oxidizing agent to convert said values into uranyl complex and pentavalent vanadium anions therein, adsorbing said anionic uranyl and pentavalent vanadium values with an anionic exchange resin to adsorb such values thereon while at least cationic materials remain in the residual solution, treating the adsorbate from the preceding step with a selective aqueous elutriant solvent to elute the uranium away from the vanadium which remains on the resin producing thereby a solution of separated uranium, then contacting said adsorbate with a reducing agent to reduce the vanadium to the tetravalent state on the resin, and finally eluting the tetravalent vanadium in a cationic form from the resin with an aqueous elutriant solvent to produce a solution of separated vanadium, whereby other anions adsorbed from said acid remain on the resin.

11. The process as defined in claim 10, but wherein said selective aqueous uranium elutriant solvent comprises a dilute aqueous hydrochloric acid solution.

12. In a process for separating and recovering uranium and vanadium values from an acidic phosphatic solution, the steps comprising treating such solution with a strong oxidizing agent to convert said values into uranyl complex and pentavalent vanadium anions therein, adsorbing such anions on a strongly basic anion exchange resin by contacting the oxidized solution therewith, whereby some phosphates are also adsorbed thereon and cationic materials remain in the solution, selectively removing such phosphate by elution with a sodium sulfate solution, treating the adsorbate remaining from the preceding step with a selective aqueous elutriant solvent to elute the vanadium from the resin yielding a solution of the separated vanadium values, and finally eluting the uranium from the resin with an aqueous elutriant solvent producing a solution of separated uranium values.

13. In a process for separating and purifying constituents of a substance which substance contains at least one element capable of existing in interconvertible cationic and anionic forms in an aqueous solution together with impurities, the steps comprising treating said substance with reagents to produce an aqueous solution with said element in such anionic form together with anionic and cationic impurities, contacting said solution with an anionic exchange resin to adsorb said elemental anionic form thereon and said cationic impurities remain in the solution, treating the adsorbate from the preceding step with a reagent capable of converting said anionic form to the cationic on the resin, and then treating said adsorbate with an aqueous elutriant solvent for said cationic elemental form to elute the said cationic elemental form from the resin and away from anionic impurities remaining thereon to yield an aqueous solution of values of said element.

14. The process as defined in claim 1 but wherein said reducing agent comprises a material selected from the group consisting of sulfur dioxide gas and ferrous sulphate solution, said solvent for the vanadium comprises a material selected from the group consisting of water, sulfurous acid and ferrous sulphate solutions, and said uranium solvent comprises a dilute aqueous solution.

15. The process as defined in claim 1 but wherein said reducing agent comprises a material selected from the group consisting of sulfur dioxide gas and ferrous sulphate solution, said solvent for the vanadium comprises a material selected from the group consisting of water, sulfurous acid and ferrous sulphate solutions, and said uranium solvent comprises a dilute amine hydrochloride solution.

References Cited in the file of this patent

Mellor: Comprehensive Treatise of Inorganic and Theoretical Chemistry, vol. 12, pages 132 and 133 (1932). Published by Longmans, Green & Co., London.

Sussman: Industrial and Engineering Chemistry, volume 37, page 622 (1945).

Ayres: Purification of Zirconium by Ion Exchange Columns, MDDC, 1026, declassified June 30, 1947. Technical Information Division, A. E. C. Oak Ridge, Tennessee.